3,347,916
PROCESS FOR PREPARING N-FORMYL COMPOUNDS USING BORIC ACID AS CATALYST

Ludwig Konrad Huber, Philadelphia, Pa., assignor to Pennsalt Chemical Corporation, Philadelphia, Pa., a corporation of Pennsylvania
No Drawing. Filed Oct. 11, 1965, Ser. No. 494,944
7 Claims. (Cl. 260—561)

ABSTRACT OF THE DISCLOSURE

An amine, for example, primary and secondary alkyl amines, aromatic amines and substituted hydrazines, is reacted with formamide in the presence of boric acid as a catalyst to convert said amine to the N-formyl derivative.

---

This invention disclosure relates to the preparation of N-formyl compounds. More particularly, it relates to the N-formylation of an N-base compound with formamide by use of boric acid, $H_3BO_3$, as catalyst.

The preparation of N-formyl compounds by the reaction of the corresponding N-bases with formamide has long been known. Sugasawa et al., Pharm. Soc. Japan, 62, 531 (1942); Chemical Abstracts, 45, 286 (1951). The reaction can be characterized generally by the following equation:

$$HCONH_2 + HNR_2 \rightarrow HCONR_2 + NH_3$$

Formamide is a liquid formylating agent with a comparatively high boiling point (193° C.) which in distinction to other formylating agents (especially gaseous carbon monoxide and lower boiling derivatives of formic acid, especially esters), permits liquid-phase reactions at atmospheric pressure over a wide temperature range. The by-product formed in the reaction is ammonia which, because it is easily volatilized from the reaction mixture, helps to shift the equilibrium and also does not interfere by side reactions. Other formylating agents, e.g. formic acid, alkylformates, and chloral, form higher boiling by-products (water, alcohols, chloroform, etc.) which can interfere with the reaction and require extra separation steps.

The main disadvantage of formamide as a formylating agent is its comparatively low reactivity. For this reason, the known method has found application primarily for the formylation of higher boiling N-compounds, which also at atmospheric pressure allow sufficiently high liquid-phase reaction temperatures.

I have now found that formamide exhibits a highly increased formylating power in the presence of boric acid catalyst. In the presence of a catalytic amount of boric acid, formamide reacts with an N-base compound even at room temperature to form an N-formyl compound, and even low boiling N-compounds, e.g., methylamine or diethylamine, can be formylated without application of pressure. Also, thermo-sensitive compounds, e.g. hydrazines, now can be formylated with formamide at moderate temperatures in much shorter reaction ties than previously possible. The high activating effect of boric acid is shown by the fact that the rate of formation of N-formyl compounds by the process of this invention is about ten times as high as that obtained in the absence of boric acid under otherwise identical conditions.

In carrying out the formylation step, solutions of boric acid in formamide are treated with the desired N-base, either by introducing the N-base as a gas at an appropriate temperature, or by adding the liquid, or solid, N-base, preferably in equimolecular amounts, and then heating the reaction mixture until ammonia evolution ceases. If a low boiling N-base, e.g., methylamine, dimethylamine or ethylamine, is to be formylated, choice of suitable condenser temperature permits the reaction of such gases at atmospheric pressure and the simultaneous separation of the by-product ammonia without loss of reactants. The formylated products are recovered from the reaction mass by distillation, sublimation, extraction, or other known separation means. Distillation is preferably used for recovery of the product.

Boric acid is employed preferably in less than equimolecular amounts. Most preferably, a 10% solution of boric acid in formamide is used. The concentration of boric acid in formamide can vary widely and can range from a catalytic trace to a saturated solution.

N-bases having at least one hydrogen atom attached to the nitrogen atom advantageously can be formylated by the catalytic process of the invention. In general, the process can be advantageously used to formylate an N-base compound which is a primary or secondary alkyl amine, an aromatic amine, (including aralkylamine and alkarylamine), or a mono-, di- or tri-substituted hydrazine to form the corresponding formylated compound.

Examples of preferred N-base compounds and of the products formed are as follows:

| N-base compound: | Product |
|---|---|
| Methylamine | Methylformamide. |
| Dimethylamine | Dimethylformamide. |
| Ethylamine | Ethylformamide. |
| Diethylamine | Diethylformamide. |
| n-Propylamine | n-Propylformamide. |
| n-Isopropylamine | n-Isopropylformamide. |
| Di-n-propylamine | Di-n-Propylformamide. |
| n-Butylamine | n-Butylformamide. |
| n-Isobutylamine | n-Isobutylformamide. |
| n-Amylamine | n-Amylformamide. |
| n-Hexylamine | n-Hexylformamide. |
| Laurylamine | Laurylformamide. |
| Aniline | Phenylformamide. |
| Benzylamine | Benzylformamide. |
| Phenetylamine | Phenetylformamide. |
| o-Toluidine | o-Tolylformamide. |
| N-methylhydrazine | N-methyl-N'-formylhydrazine. |
| N,N-dimethylhydrazine | N,N-dimethyl-N'-formylhydrazine. |
| N,N-dimethyl-N'-ethylhydrazine | N,N-dimethyl-N'-ethyl-N'-formylhydrazine. |

The process can be further understood from the following examples.

Example 1

Into a solution of 2.0 g. boric acid (0.032 mole) in 22.5 g. formamide (0.5 mole), a stream of dimethylamine was introduced rapidly at ambient room temperature for about 1½ hours. An exothermic reaction occurred and the temperature rose to about 50° C. for a short time. At the end of the reaction period, excess amine was removed using vacuum. The reaction mixture was extracted with chloroform, and chloroform extract was distilled under reduced pressure. 9.4 g. of constant-boiling product (25.8% conversion by weight based on formamide) were recovered. The product was identified as dimethylformamide by its intra-red spectrum and by elemental analysis.

Calculated: 49.30% C, 9.65% H, 19.17% N. Found: 49.55% C, 10.73% H, 18.27% N.

In a parallel experiment carried out under identical conditions but without boric acid, only 1.1 g. dimethylformamide were formed. This corresponds to a conversion of only about 3%.

Example 2

Into a mixture of 50 g. formamide (1.1 mole) and 5 g. boric acid (0.08 mole) at 60° C. a rapid stream of methylamine was introduced for 2 hours. After the low boiling materials were removed, the product was distilled at reduced pressure to yield 17 g. (26% conversion based on formamide) of constant-boiling (90° C. at 9–11 mm. Hg) liquid. The infra-red spectrum of the product matched that of methylformamide. The refractive index confirmed the formation of methylformamide ($N_D^{25}$ 1.4299, lit.: 1.4300).

A reaction of methylamine with formamide carried out under identical conditions, but without boric acid, produced 1.7 g. methylformamide, identified by infra-red spectrum, which corresponds to about only 2.5% conversion.

*Example 3*

A mixture of 15 g. formamide (0.33 mole), 1.5 g. boric acid (0.024 mole) and 22 g. N,N-dimethylhydrazine (0.36 mole) was heated to 70–90° C. for 12 hours. A strong evolution of ammonia took place, causing a weight decrease of about 6.9 g. (corresponding to 0.37 mole ammonia). Subsequent distillation yielded 5.8 g. of unreacted dimethylhydrazine and 23.1 g. of liquid residue, both indicating an 80% conversion (based on formamide). The liquid residue was cooled to 5° C. 9 g. of white crystals were formed corresponding to a recovery of 31%. (The mother liquor contained more of the material.) The crystals were purified by sublimation under high vacuum. The product was identified as N,N-dimethyl-N'-formylhydrazine by its melting point (59–62° C., lit.: 57° C.) and by elemental analysis.

Calculated: 40.88% C, 9.15% H, 31.80% N. Found: 41.10% C, 8.85% H, 31.65% N.

In a parallel experiment without boric acid, the conversion to N,N-dimethyl-N'-formylhydrazine was less than 3%.

Many different embodiments of this invention can be made without departing from the scope and spirit of it, and it is to be understood that my invention includes such embodiments and is not to be limited by the above description.

I claim:
1. A process for the preparation of N-formyl compounds which comprises reacting formamide with a compound selected from the class consisting of primary alkyl amines having up to 12 carbon atoms, secondary alkyl amines having up to 6 carbon atoms, aromatic amines selected from the group consisting of aniline, benzylamine, phenetylamine and o-toluidine, and substituted hydrazines selected from the group consisting of N-methylhydrazine, N,N-dimethylhydrazine and N,N-dimethyl-N'-ethylhydrazine, in the presence of a catalytic amount of boric acid catalyst.
2. The process according to claim 1 in which the amount of boric acid catalyst is at least 10% by weight of formamide used.
3. The process according to claim 1 in which the primary alkyl amine is methylamine.
4. The process according to claim 1 in which the secondary alkylamine is dimethylamine.
5. The process according to claim 1 in which the hydrazine is N,N-dimethylhydrazine.
6. The process according to claim 1 in which the secondary alkyl amine is diethylamine.
7. The process according to claim 1 in which the aromatic amine is aniline.

References Cited
UNITED STATES PATENTS

| 2,574,505 | 11/1951 | Sletzinger et al. | 260—561 |
| 2,711,415 | 6/1955 | Cottle et al. | 260—561 |
| 3,023,241 | 2/1962 | Twelves | 260—561 |

ALEX MAZEL, *Primary Examiner.*

J. NARCAVAGE, *Assistant Examiner.*

UNITED STATES PATENT OFFICE
CERTIFICATE OF CORRECTION

Patent No. 3,347,916            October 17, 1967

Ludwig Konrad Huber

It is hereby certified that error appears in the above numbered patent requiring correction and that the said Letters Patent should read as corrected below.

Column 1, lines 56 and 57, for "diethylamine" read -- dimethylamine --; line 60, for "ties" read -- times --; column 2, line 63, for "intra-red" read -- infra-red --.

Signed and sealed this 29th day of October 1968.

(SEAL)
Attest:

Edward M. Fletcher, Jr.

Attesting Officer

EDWARD J. BRENNE

Commissioner of Patent